US012602683B2

(12) United States Patent
Liang et al.

(10) Patent No.: US 12,602,683 B2
(45) Date of Patent: Apr. 14, 2026

(54) METHODS AND APPARATUSES FOR GENERATING, VERIFYING AND STORING TRANSACTION VOUCHER, DEVICES AND SYSTEM

(71) Applicant: Digital Currency Institute, The People's Bank of China, Beijing (CN)

(72) Inventors: Wei Liang, Beijing (CN); Kefeng Xu, Beijing (CN); Yongchao Bian, Beijing (CN)

(73) Assignee: Digital Currency Institute, the People's Bank of China, Beijing (CN)

( * ) Notice: Subject to any disclaimer, the term of this patent is extended or adjusted under 35 U.S.C. 154(b) by 104 days.

(21) Appl. No.: 18/283,779

(22) PCT Filed: Mar. 21, 2022

(86) PCT No.: PCT/CN2022/081931
§ 371 (c)(1),
(2) Date: Sep. 22, 2023

(87) PCT Pub. No.: WO2022/206446
PCT Pub. Date: Oct. 6, 2022

(65) Prior Publication Data
US 2024/0177151 A1 May 30, 2024

(30) Foreign Application Priority Data
Mar. 31, 2021 (CN) .......................... 202110352576.4

(51) Int. Cl.
*G06Q 20/38* (2012.01)
*G06Q 20/06* (2012.01)
(Continued)

(52) U.S. Cl.
CPC ..... *G06Q 20/387* (2013.01); *G06Q 20/38215* (2013.01); *G06Q 20/3825* (2013.01);
(Continued)

(58) Field of Classification Search
CPC ........... G06Q 20/387; G06Q 20/38215; G06Q 20/3825; G06Q 20/3827; G06Q 20/3829;
(Continued)

(56) References Cited

U.S. PATENT DOCUMENTS

2015/0324764 A1 11/2015 Van Rooyen et al.
2019/0236560 A1 8/2019 Song
(Continued)

FOREIGN PATENT DOCUMENTS

CN 107240010 A * 10/2017 ........... G06Q 20/108
CN 107358424 A 11/2017
(Continued)

OTHER PUBLICATIONS

Rt "Central Bank Digital Currency Research Report Design of DCEP", Dec. 30, 2019, 17 pages (Year: 2019).*
(Continued)

*Primary Examiner* — James D Nigh
(74) *Attorney, Agent, or Firm* — The Sun IP Law

(57) ABSTRACT

Methods and apparatuses for generating, verifying and storing a transaction voucher, devices and a system are provided. The method includes: in response to a received transaction request, chain structure data of a digital currency is acquired, the chain structure data including a first currency string (S101); and a transaction voucher corresponding to a denomination of a current transaction is generated based on the chain structure data, the transaction voucher including a second currency string of a corresponding denomination and a second sub-chain, and the second sub-chain including current transaction information of the second currency string (S102). On the one hand, a pay warrant is provided for a transaction, so that the transaction is traceable, and the security of the transaction is ensured. On the other hand, the reading and storage efficiency of transaction data can be (Continued)

In response to a received transaction request, chain structure data of a digital currency is acquired, the chain structure data including a first currency string — S101

A transaction voucher corresponding to a denomination of a current transaction is generated based on the chain structure data, the transaction voucher including a second currency string of a corresponding denomination and a second sub-chain, and the second sub-chain including current transaction information of the second currency string — S102 improved, and the transaction efficiency and the user experience can also be improved.

18 Claims, 6 Drawing Sheets

(51) Int. Cl.

| | |
|---|---|
| *G06Q 20/22* | (2012.01) |
| *G06Q 20/36* | (2012.01) |
| *G06Q 20/40* | (2012.01) |
| *G06Q 30/0207* | (2023.01) |
| *H04L 9/00* | (2022.01) |

(52) U.S. Cl.
CPC ..... *G06Q 20/3827* (2013.01); *G06Q 20/3829* (2013.01); *G06Q 20/389* (2013.01); *G06Q 20/401* (2013.01); *G06Q 30/0207* (2013.01)

(58) Field of Classification Search
CPC .. G06Q 20/389; G06Q 20/401; G06Q 20/223; G06Q 20/3678; G06Q 20/382; G06Q 20/065; G06Q 30/0207; H04L 2209/56; H04L 9/50
USPC .......................................................... 705/75
See application file for complete search history.

(56) References Cited

U.S. PATENT DOCUMENTS

| | | | |
|---|---|---|---|
| 2021/0012331 A1 | 1/2021 | Higgins | |
| 2022/0083988 A1* | 3/2022 | Lynberg | ............... G06Q 20/389 |

FOREIGN PATENT DOCUMENTS

| | | | | | |
|---|---|---|---|---|---|
| CN | 108921542 | A | | 11/2018 | |
| CN | 109544152 | A | | 3/2019 | |
| CN | 110458557 | A | | 11/2019 | |
| CN | 110852729 | A | * | 2/2020 | ......... G06Q 20/3674 |
| CN | 110852730 | A | * | 2/2020 | ........... G06Q 20/065 |
| CN | 111144862 | A | | 5/2020 | |
| CN | 111539720 | A | | 8/2020 | |
| CN | 111815320 | A | | 10/2020 | |
| CN | 112633875 | A | * | 4/2021 | ............. G06Q 40/04 |
| CN | 113052599 | A | | 6/2021 | |
| CN | 113962676 | A | | 1/2022 | |
| CN | 114529279 | A | * | 5/2022 | ............. G06Q 40/03 |
| CN | 114548980 | A | * | 5/2022 | ......... G06Q 20/3825 |
| DE | 102021000570 | A1 | * | 8/2022 | ......... G06Q 20/3676 |
| EP | 3073670 | A1 | | 9/2016 | |
| WO | 2020168564 | A1 | | 8/2020 | |

OTHER PUBLICATIONS

Allen et al. Design Choices for Central Bank Digital Currency: Policy and Technical Considerations, Jul. 23, 2020, 109 pages (Year: 2020).*
Xu "A brief analysis of the central bank's digital currency DC/EP/ dual offline payment scenarios and solutions", retrieved from https:// www.mpaypass.com.cn/news/201912/06094420.html, Dec. 12, 2019, 16 pages (Year: 2019).*
English Translation of DE 10 2021 000 570 A1, Feb. 4, 2021 (Year: 2021).*
English translation of cited CN 107240010 (Year: 2016).*
English translation of cited CN 110852729 (Year: 2019).*
English translation of cited 110852730 (Year: 2019).*
English translation of cited 112633875 (Year: 2020).*
English translation of cited 114529279 (Year: 2020).*
English translation of cited 114548980 (Year: 2020).*
Xu Gang. Non-official translation: Analysis for DC/EP Dual Offline Payment Scenarios and Schemes of Central Bank Digital Currency) https://www.mpaypass.com.cn/news/201912/06094420.html,Dec. 6, 2019(Dec. 6, 2019), pp. 1-11.
MephaustRt. Non-official translation: Central Bank Digital Currency Research Report(1):Design of DCEP https://zhuanlan.zhihu. com/p/100221778,Dec. 30, 2019(Dec. 30, 2019), pp. 1-13.
The grant supplementary search report of counterpart CN application No. 202110352576.4 issued on Apr. 3, 2024.
The search report of counterpart EP application No. 22778629.0 issued on Sep. 17, 2024.

* cited by examiner

Fig. 1

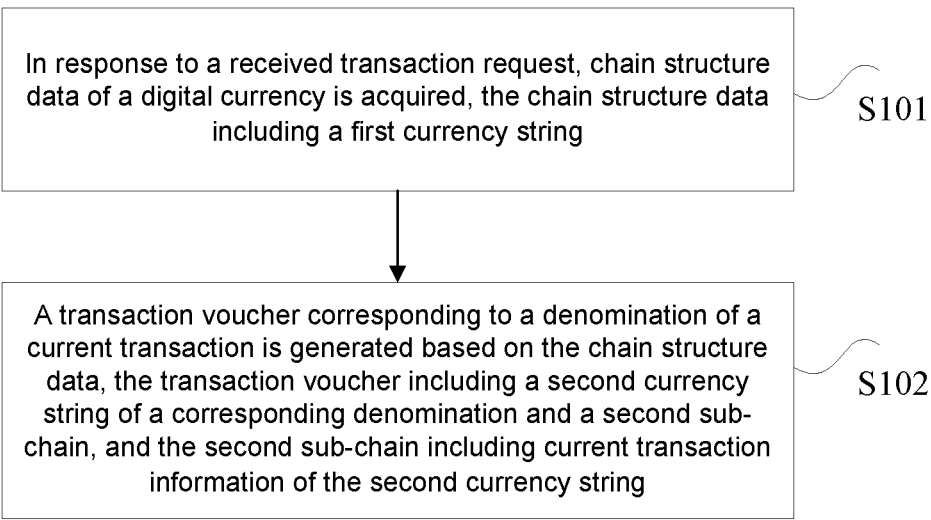

In response to a received transaction request, chain structure data of a digital currency is acquired, the chain structure data including a first currency string — S101

A transaction voucher corresponding to a denomination of a current transaction is generated based on the chain structure data, the transaction voucher including a second currency string of a corresponding denomination and a second sub-chain, and the second sub-chain including current transaction information of the second currency string — S102

Fig. 2

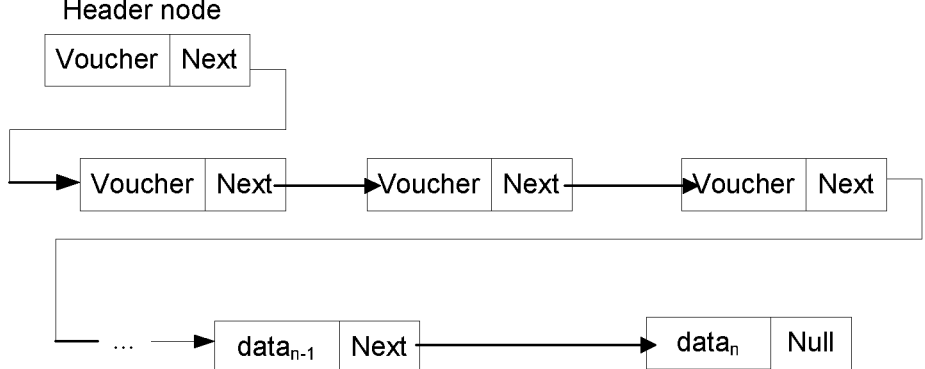

Fig. 3

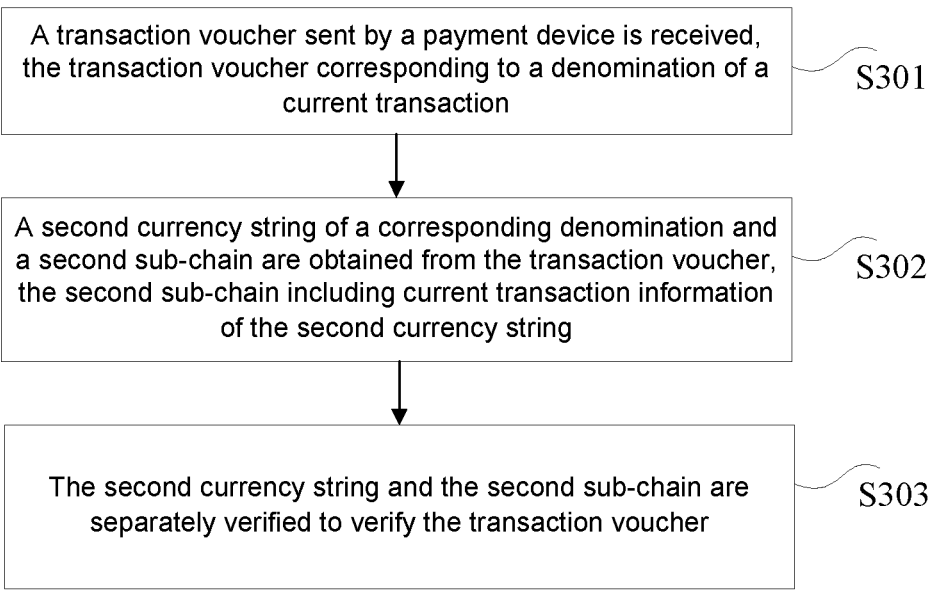

A transaction voucher sent by a payment device is received, the transaction voucher corresponding to a denomination of a current transaction  — S301

A second currency string of a corresponding denomination and a second sub-chain are obtained from the transaction voucher, the second sub-chain including current transaction information of the second currency string  — S302

The second currency string and the second sub-chain are separately verified to verify the transaction voucher  — S303

Fig. 4

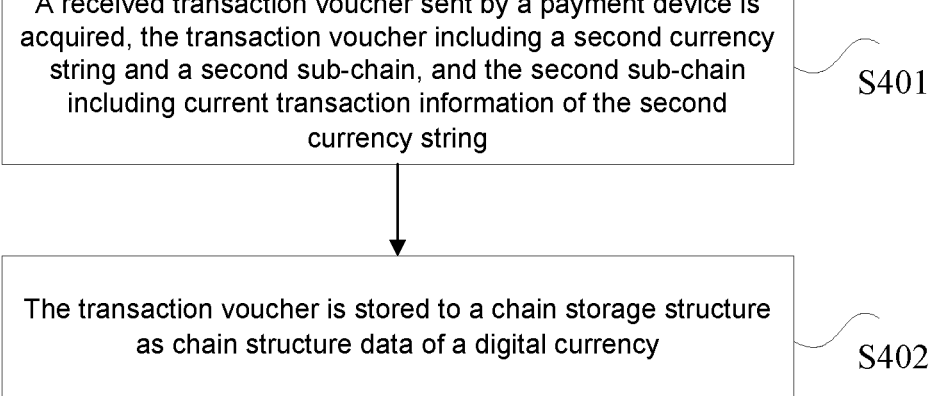

A received transaction voucher sent by a payment device is acquired, the transaction voucher including a second currency string and a second sub-chain, and the second sub-chain including current transaction information of the second currency string  — S401

The transaction voucher is stored to a chain storage structure as chain structure data of a digital currency  — S402

1300

METHODS AND APPARATUSES FOR GENERATING, VERIFYING AND STORING TRANSACTION VOUCHER, DEVICES AND SYSTEM

CROSS-REFERENCE TO RELATED APPLICATION

This application claims priority to China Patent Application No. 202110352576.4, filed on Mar. 31, 2021 in China National Intellectual Property Administration and entitled "Methods and Apparatuses for Generating, Verifying and Storing Transaction Voucher, Devices and System" which is hereby incorporated by reference in its entirety.

TECHNICAL FIELD

The present disclosure relates to the technical field of computers, in particular to methods and apparatuses for generating, verifying and storing a transaction voucher, devices and a system.

BACKGROUND

In existing digital currency transaction, there is no payment certificate in the transaction between a payee and a payer. Disputes cannot be traced. At the same time, because data in a transmission process is likely to be hijacked or forged by intermediaries, digital currency is likely to be stolen, which easily leads to information leakage in the transmission process. In addition, both the payee and the payer use an array manner to perform fixed storage on transaction record data, resulting in low efficiency of storing and reading details of each transaction.

In a process of implementing this present application, the inventor has found that there are at least the following problems in the prior art: There is no payment certificate in a transaction, so the transaction cannot be traced. Furthermore, the security of the transaction cannot be guaranteed. In addition, the efficiency of reading and storing transaction data is low. The transaction efficiency is low, and the user experience is poor.

SUMMARY

In view of this, embodiments of the present disclosure provide methods for generating, verifying and storing a transaction voucher, relevant apparatuses, a payment device, a collection device and a transaction system, which can provide a payment certificate for a transaction, so that the transaction can be traced, ensuring the security of the transaction, improving the efficiency of reading and storing transaction data, and improving the transaction efficiency and the user experience.

In order to achieve the above objective, according to one aspect of the embodiments of the present disclosure, a method for generating a transaction voucher is provided.

A method for generating the transaction voucher includes: in response to a received transaction request, acquiring chain structure data of a digital currency, the chain structure data including a first currency string; and generating based on the chain structure data, a transaction voucher corresponding to a denomination of a current transaction, the transaction voucher including a second currency string of a corresponding denomination and a second sub-chain, and the second sub-chain including current transaction information of the second currency string.

As at least one alternative embodiment, wherein the chain structure data further includes a first sub-chain, wherein the first sub-chain includes historical transaction information of the first currency string, and the second sub-chain further includes the first sub-chain.

As at least one alternative embodiment, wherein a denomination of the first currency string is greater than a denomination of the second currency string; and generating based on the chain structure data, the transaction voucher corresponding to the denomination of the current transaction includes: generating two or more pieces of first chain structure data based on the chain structure data, the two or more pieces of first chain structure data including the first sub-chain, and at least one piece of the first chain structure data including the second currency string; and generating the transaction voucher based on the first chain structure data including the second currency string and the current transaction information of the second currency string.

As at least one alternative embodiment, wherein generating the transaction voucher based on the first chain structure data including the second currency string and the current transaction information of the second currency string includes: connecting the first sub-chain in the first chain structure data including the second currency string to chain data generated based on the current transaction information of the second currency string, as to obtain the second sub-chain; and signing the second sub-chain, and generating the transaction voucher based on the second currency string and the signed second sub-chain.

As at least one alternative embodiment, wherein the first currency string and the second currency string are the same currency string; and generating based on the chain structure data, the transaction voucher corresponding to the denomination of the current transaction includes: connecting the first sub-chain in the chain structure data to chain data generated based on the current transaction information of the second currency string, as to obtain the second sub-chain; and signing the second sub-chain, and generating the transaction voucher based on the second currency string and the signed second sub-chain.

As at least one alternative embodiment, after generating the transaction voucher, including: deleting the chain structure data used for generating the transaction voucher from a chain storage structure in which the chain structure data is located.

As at least one alternative embodiment, wherein the chain storage structure is a chain table, and the chain structure data is obtained by traversing the chain table.

As at least one alternative embodiment, wherein a plurality of transaction vouchers are generated; each transaction voucher is generated based on one piece of chain structure data; first currency strings of various pieces of chain structure data respectively have respective denominations; a sum of denominations corresponding to the plurality of transaction vouchers is equal to a total digital currency amount of the current transaction; and the method further includes: generating a transaction voucher chain in a form of a data chain based on the plurality of transaction vouchers.

As at least one alternative embodiment, after generating the transaction voucher corresponding to the denomination of the current transaction, including: performing a hash operation by using a first random number and a second random number, to obtain a session key; and encrypting the transaction voucher by using the session key, and sending the encrypted transaction voucher to a collection device.

As at least one alternative embodiment, in a case where it is verified that personal certificates of a payment device and the collection device are valid, performing the hash operation by using the first random number and the second random number, to obtain the session key is executed.

According to another aspect of the embodiments of the present disclosure, a method for verifying a transaction voucher is provided.

The method for verifying the transaction voucher includes: receiving a transaction voucher sent by a payment device, the transaction voucher corresponding to a denomination of a current transaction; obtaining a second currency string of a corresponding denomination and a second sub-chain from the transaction voucher, the second sub-chain including current transaction information of the second currency string; and respectively verifying the second currency string and the second sub-chain to verify the transaction voucher.

As at least one alternative embodiment, wherein respectively verifying the second currency string and the second sub-chain includes: respectively verifying a validity of a signature of the second currency string and a validity of a signature of the second sub-chain.

As at least one alternative embodiment, wherein verifying the validity of the signature of the second currency string includes: verifying that the signature of the second currency string is a two-stage signature generated by a central bank digital currency system and an operating agency digital currency system; and verifying the validity of the signature of the second sub-chain includes: verifying that the signature of the second sub-chain is a signature of a payer corresponding to the payment device.

As at least one alternative embodiment, wherein receiving the transaction voucher sent by the payment device includes: receiving a transaction voucher chain, sent by the payment device, in a form of a data chain, the transaction voucher including a plurality of transaction vouchers, and a sum of denominations corresponding to the plurality of transaction vouchers being equal to a total digital currency amount of the current transaction; and obtaining the second currency string of the corresponding denomination and the second sub-chain from the transaction voucher includes: obtaining the plurality of transaction vouchers from the transaction voucher chain, and obtaining the second currency string of the corresponding denomination and the second sub-chain from each transaction voucher.

According to still another aspect of the embodiments of the present disclosure, a method for storing a transaction voucher is provided.

The method for storing the transaction voucher includes: obtaining a received transaction voucher sent by a payment device, the transaction voucher including a second currency string and a second sub-chain, and the second sub-chain including current transaction information of the second currency string; and storing the transaction voucher to a chain storage structure as chain structure data of a digital currency.

As at least one alternative embodiment, wherein one transaction voucher is obtained; and storing the transaction voucher to the chain storage structure as chain structure data of the digital currency includes: interpolating the transaction voucher to a data region of one node of the chain storage structure, the node further including a voucher region used for storing an address of a next node of the node.

As at least one alternative embodiment, wherein a plurality of transaction vouchers are obtained, and the plurality of transaction vouchers form a transaction voucher chain in a form of a data chain; and storing the transaction voucher to the chain storage structure as the chain structure data of the digital currency includes: interpolating the plurality of transaction vouchers of the transaction voucher chain to data regions of a plurality of nodes of the chain storage structure based on an order of the plurality of transaction vouchers in the transaction voucher chain, each node further including a voucher region used for storing an address of a next node of the corresponding node.

As at least one alternative embodiment, storing the transaction voucher to the chain storage structure as the chain structure data of the digital currency includes: modifying a preset logo on the transaction voucher to another locally preset logo, as to transform the transaction voucher into a balance voucher, and storing the balance voucher to the chain storage structure.

As at least one alternative embodiment, the chain storage structure is a chain table.

As at least one alternative embodiment, the chain storage structure is stored in a local secure element (SE) chip.

According to yet another aspect of the embodiments of the present disclosure, a transaction method is provided.

The transaction method includes: generating, by a payment device, a payment voucher, and sending the generated payment voucher to a collection device; verifying, by the collection device, the received payment voucher, and determining that verification of the payment voucher succeeds; and storing, by the collection device, the payment voucher succeeding in verification to a chain storage structure.

According to yet another aspect of the embodiments of the present disclosure, an apparatus for generating a transaction voucher is provided.

The apparatus for generating the transaction voucher includes: a chain structure data acquiring module, configured to: in response to a received transaction request, acquire chain structure data of a digital currency, the chain structure data including a first currency string; and a transaction voucher generation module, configured to generate, on the basis of the chain structure data, a transaction voucher corresponding to a denomination of a current transaction, the transaction voucher including a second currency string of a corresponding denomination and a second sub-chain, and the second sub-chain including current transaction information of the second currency string.

As at least one alternative embodiment, wherein the chain structure data further includes a first sub-chain, wherein the first sub-chain includes historical transaction information of the first currency string, and the second sub-chain further includes the first sub-chain.

As at least one alternative embodiment, wherein a denomination of the first currency string is greater than a denomination of the second currency string; and the transaction voucher generation module is further configured to: generate two or more pieces of first chain structure data based on the chain structure data, the two or more pieces of first chain structure data including the first sub-chain, and at least one piece of the first chain structure data including the second currency string; and generate the transaction voucher based on the first chain structure data including the second currency string and the current transaction information of the second currency string.

As at least one alternative embodiment, the transaction voucher generation module is further configured to: connect the first sub-chain in the first chain structure data including the second currency string to chain data generated based on the current transaction information of the second currency string, as to obtain the second sub-chain; and sign the second sub-chain, and generating the transaction voucher based on the second currency string and the signed second sub-chain.

As at least one alternative embodiment, wherein the first currency string and the second currency string are the same currency string; and the transaction voucher generation module is further configured to: connect the first sub-chain in the chain structure data to chain data generated based on the current transaction information of the second currency string, as to obtain the second sub-chain; and sign the second sub-chain, and generating the transaction voucher based on the second currency string and the signed second sub-chain.

As at least one alternative embodiment, the apparatus further includes a deleting module, configured to: delete the chain structure data used for generating the transaction voucher from a chain storage structure in which the chain structure data is located.

As at least one alternative embodiment, wherein the chain storage structure is a chain table, and the chain structure data is obtained by traversing the chain table.

As at least one alternative embodiment, wherein a plurality of transaction vouchers are generated; each transaction voucher is generated based on one piece of chain structure data; first currency strings of various pieces of chain structure data respectively have respective denominations; a sum of denominations corresponding to the plurality of transaction vouchers is equal to a total digital currency amount of the current transaction; and the transaction voucher generation module is further configured to: generate a transaction voucher chain in a form of a data chain based on the plurality of transaction vouchers.

As at least one alternative embodiment, the apparatus further includes a transaction voucher sending module, configured to: perform a hash operation by using a first random number and a second random number, to obtain a session key; and encrypt the transaction voucher by using the session key, and sending the encrypted transaction voucher to a collection device.

As at least one alternative embodiment, in a case where it is verified that personal certificates of a payment device and the collection device are valid, performing the hash operation by using the first random number and the second random number, to obtain the session key is executed.

According to still yet another aspect of the embodiments of the present disclosure, an apparatus for verifying a transaction voucher.

The apparatus for verifying a transaction voucher includes: a transaction voucher receiving module, configured to receive a transaction voucher sent by a payment device, the transaction voucher corresponding to a denomination of a current transaction; a data extraction module, configured to obtain a second currency string of a corresponding denomination and a second sub-chain from the transaction voucher, the second sub-chain including current transaction information of the second currency string; and a data verification module, configured to respectively verify the second currency string and the second sub-chain to verify the transaction voucher.

As at least one alternative embodiment, the data verification module is further configured to respectively verify a validity of a signature of the second currency string and a validity of a signature of the second sub-chain.

As at least one alternative embodiment, the data verification module is further configured to verify that the signature of the second currency string is a two-stage signature generated by a central bank digital currency system and an operating agency digital currency system; and verify that the signature of the second sub-chain is a signature of a payer corresponding to the payment device.

As at least one alternative embodiment, the transaction voucher receiving module is further configured to receive a transaction voucher chain, sent by the payment device, in a form of a data chain, the transaction voucher including a plurality of transaction vouchers, and a sum of denominations corresponding to the plurality of transaction vouchers being equal to a total digital currency amount of the current transaction; and the data extraction module is configured to obtain the plurality of transaction vouchers from the transaction voucher chain, and obtain the second currency string of the corresponding denomination and the second sub-chain from each transaction voucher.

According to still yet another aspect of the embodiments of the present disclosure, an apparatus for storing a transaction voucher is provided.

The apparatus for storing the transaction voucher includes: a transaction voucher acquiring module, configured to obtain a received transaction voucher sent by a payment device, the transaction voucher including a second currency string and a second sub-chain, and the second sub-chain including current transaction information of the second currency string; and a data storage module, configured to store the transaction voucher to a chain storage structure as chain structure data of a digital currency.

As at least one alternative embodiment, wherein one transaction voucher is obtained; and the data storage module is configured to interpolate the transaction voucher to a data region of one node of the chain storage structure, the node further including a voucher region used for storing an address of a next node of the node.

As at least one alternative embodiment, wherein a plurality of transaction vouchers are obtained, and the plurality of transaction vouchers form a transaction voucher chain in a form of a data chain; and the data storage module is configured to interpolate the plurality of transaction vouchers of the transaction voucher chain to data regions of a plurality of nodes of the chain storage structure based on an order of the plurality of transaction vouchers in the transaction voucher chain, each node further including a voucher region used for storing an address of a next node of the corresponding node.

As at least one alternative embodiment, the data storage module is further configured to modify a preset logo on the transaction voucher to another locally preset logo, as to transform the transaction voucher into a balance voucher, and store the balance voucher to the chain storage structure.

As at least one alternative embodiment, the chain storage structure is a chain table.

As at least one alternative embodiment, the chain storage structure is stored in a local SE chip.

According to still yet another aspect of the embodiments of the present disclosure, a payment device is provided.

The payment device includes the apparatus for generating a transaction voucher based on the embodiments of the present disclosure.

According to still yet another aspect of the embodiments of the present disclosure, a collection device is provided.

The collection device includes: the apparatus for verifying a transaction voucher according to the embodiments of the present disclosure, and the apparatus for storing a transaction voucher according to the embodiments of the present disclosure.

According to still yet another aspect of the embodiments of the present disclosure, a transaction system is provided.

The transaction system includes: the payment device according to the embodiments of the present disclosure, and the collection device according to the embodiments of the present disclosure.

According to still yet another aspect of the embodiments of the present disclosure, an electronic device is provided.

The electronic device includes: one or more processors; and a memory, configured to store one or more programs. The one or more programs, when executed by the one or more processors, cause the one or more processors to perform the method for generating a transaction voucher, the method for verifying a transaction voucher, or the method for storing a transaction voucher according to the embodiments of the present disclosure.

According to still yet another aspect of the embodiments of the present disclosure, a computer-readable medium is provided.

The computer-readable medium stores a computer program. The program, when executed by a processor, implements the method for generating a transaction voucher, the method for verifying a transaction voucher, or the method for storing a transaction voucher according to the embodiments of the present disclosure.

One embodiment in the disclosure has the following advantages or beneficial effects: in response to a received transaction request, chain structure data of a digital currency is acquired, the chain structure data including a first currency string; and a transaction voucher corresponding to a denomination of a current transaction is generated based on the chain structure data, the transaction voucher including a second currency string of a corresponding denomination and a second sub-chain, and the second sub-chain including current transaction information of the second currency string. A payment certificate can be provided for a transaction, so that the transaction can be traced. The method for verifying a transaction voucher provided according to another embodiment of the present disclosure can ensure the security of the transaction. The method for storing a transaction voucher according to still another embodiment of the present disclosure can improve the efficiency of reading and storing transaction data. The various embodiments of the present disclosure can improve the transaction efficiency and the user experience.

Further effects of the above nonconventional optional manners will be described below in combination with specific implementations.

BRIEF DESCRIPTION OF THE DRAWINGS

The accompanying drawings are used for better understanding of the present disclosure, and do not constitute a limitation to the present disclosure. In the drawings:

FIG. 1 is a schematic diagram of main steps of a method for generating a transaction voucher according to one embodiment of the present disclosure;

FIG. 2 is a schematic diagram of a chain storage structure according to one embodiment of the present disclosure;

FIG. 3 is a schematic diagram of main steps of a method for verifying a transaction voucher according to one embodiment of the present disclosure;

FIG. 4 is a schematic diagram of main steps of a method for storing a transaction voucher according to one embodiment of the present disclosure;

DETAILED DESCRIPTION OF THE EMBODIMENTS

Figure 5:
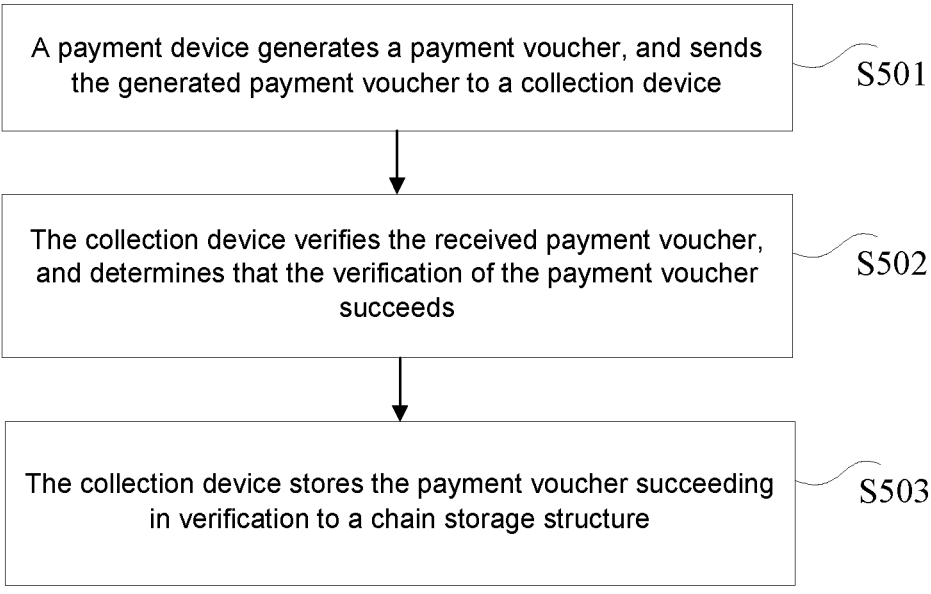
FIG. 5 is a schematic diagram of a transaction flow according to one embodiment of the present disclosure.

Exemplary embodiments of the present disclosure are described below with reference to the accompanying drawings, which include various details of the embodiments of the present disclosure to facilitate understanding and should be considered as exemplary only. Accordingly, those of ordinary skill in the art will recognize that various changes and modifications of the embodiments described herein can be made without departing from the scope and spirit of the present disclosure. Also, descriptions of well-known functions and structures are omitted from the following description for clarity and conciseness.

FIG. 1 is a schematic diagram of main steps of a method for generating a transaction voucher according to one embodiment of the present disclosure.

As shown in FIG. 1, the method for generating the transaction voucher according to one embodiment of the present disclosure mainly includes following step S101 to step S102.

Step S101: In response to a received transaction request, chain structure data of a digital currency is acquired, the chain structure data including a first currency string.

The chain structure data of the digital currency is stored in a local chain storage structure. Chain structure data of digital currencies with one or more denominations may be searched and obtained from the chain storage structure based on a total digital currency amount of a current transaction indicated in the transaction request. The obtained chain structure data of the digital currency of each denomination includes a currency string that represents the digital currency. The currency string is referred to as the first currency string, and a sum of the denominations of the various pieces of obtained chain structure data should be greater than or equal to the total digital currency amount of the current transaction.

The chain structure data of the digital currency stored in the chain storage structure may include merely the first currency string, or may include the first currency string and a first sub-chain. The first sub-chain includes historical transaction information of the first currency string.

Local transaction information or the historical transaction information may include, but is not limited to, information of both parties involved in the transaction, information of a denomination of a currency string in the transaction, a transaction index, a payment public key, and the like.

Step S102: a transaction voucher corresponding to a denomination of a current transaction is generated based on the obtained chain structure data, the transaction voucher including a second currency string of a corresponding denomination and a second sub-chain, and the second sub-chain including current transaction information of the second currency string.

The denomination of the current transaction is a denomination of a currency string of the current transaction. For example, a total digital currency amount of the current transaction is 10 YUAN. If the obtained chain structure data of the various digital currencies respectively includes currency strings of 2 YUAN, 3 YUAN and 5 YUAN, there are three kinds of denominations of the currency string of the current transaction: 2 YUAN, 3 YUAN and 5 YUAN. The currency string of the current transaction is referred to as the second currency string. In response to the chain structure data corresponding to each denomination, the transaction voucher of the corresponding denomination may be generated based on step S102. In this example, three transaction vouchers corresponding to 2 YUAN, 3 YUAN and 5 YUAN may be respectively generated. Each transaction voucher at least includes the currency string of the corresponding denomination and the current transaction information of the currency string of the corresponding denomination.

The second sub-chain may further include the first sub-chain. That is, the generated transaction voucher may further include the historical transaction information related to the currency string of the corresponding denomination.

In one embodiment, the denomination of the first currency string may be greater than the denomination of the second currency string. In a case where the denomination of the first currency string is greater than the denomination of the second currency string, the transaction voucher corresponding to a denomination of a current transaction may be needed to generated based on the chain structure data, which may include: two or more pieces of first chain structure data are generated based on the chain structure data, the first chain structure data including the first sub-chain, and at least one piece of the first chain structure data including the second currency string; and the transaction voucher is generated based on the first chain structure data including the second currency string and the current transaction information of the second currency string. For example, if the total digital currency amount of the current transaction is 3 YUAN, the obtained chain structure data of the digital currency corresponds to a denomination of 5 YUAN, two pieces of first chain structure data corresponding to 2 YUAN and 3 YUAN may be generated based on the chain structure data. The two pieces of first chain structure data respectively include a currency string of 2 YUAN and a currency string of 3 YUAN. A transaction voucher including the currency string with the denomination of 3 YUAN is generated on the basis of the first chain structure data including the currency string (the second currency string) of 3 YUAN and the current transaction information of the currency string with the denomination of 3 YUAN, and the transaction voucher indicates that the amount has been paid to a collection device.

The first chain structure data that does not include the second currency string does not participate in the current transaction, and may be stored to a local chain storage structure. A specific storage method is the same as a method for storing a transaction voucher described below, and may refer to the description of a following embodiment.

The generating the transaction voucher based on the first chain structure data including the second currency string and the current transaction information of the second currency string may include: the first sub-chain in the first chain structure data including the second currency string is connected to chain data generated on the basis of the current transaction information of the second currency string to obtain the second sub-chain; and the second sub-chain is signed, and the transaction voucher is generated based on the second currency string and the signed second sub-chain. Signing the second sub-chain may be specifically adding a signature of a payer.

In one embodiment, the first currency string and the second currency string may be the same currency string. In a case where the first currency string and the second currency string are the same currency string, the generating based on the chain structure data, the transaction voucher corresponding to the denomination of the current transaction may include: the first sub-chain in the chain structure data is connected to chain data generated on the basis of the current transaction information of the second currency string to obtain the second sub-chain; and the second sub-chain is signed, and the transaction voucher is generated based on the second currency string and the signed second sub-chain.

After the transaction voucher is generated, the chain structure data used for generating the transaction voucher may be deleted from a chain storage structure in which the chain structure data is located.

In one embodiment, the chain storage structure is a chain table, and the chain structure data is obtained by traversing the chain table.

FIG. 2 shows a schematic diagram of a chain storage structure based on one embodiment of the present disclosure. A voucher is a transaction voucher; next is a pointer for indicating an address of a next voucher; data represents more subsequent vouchers; and NULL represents a null address.

In one embodiment, a plurality of transaction vouchers are generated. Each transaction voucher is generated on the basis of one piece of chain structure data. The first currency strings of the various pieces of chain structure data respectively have respective denominations. The denominations of the first currency strings of different chain structure data may be the same or different. A sum of the denominations corresponding to the plurality of transaction vouchers is equal to a total digital currency amount of the current transaction.

A transaction voucher chain in the form of a data chain may be also generated based on the plurality of transaction vouchers.

After the transaction voucher corresponding to the denomination of the current transaction is generated, a hash operation may be performed by using a first random number and a second random number, to obtain a session key; and the session key is encrypted by using a public key and then is transmitted. The transaction voucher is encrypted by using the session key, and the encrypted transaction voucher is sent to the collection device.

The method for generating the transaction voucher according to the embodiments of the present disclosure may be implemented by a payment device. By using the method according to the embodiments of the present disclosure, the payment device generates the transaction voucher, and then sends the generated transaction voucher to the collection device for transaction. The transaction voucher includes a currency string, so that the payment device pays the currency string to the collection device in the transaction process. In this process, the payment device and the collection device may work in an offline state, without being connected to an Internet. The payment device and the collection device may interact with each other by means of near communication (such as near field communication and Bluetooth) and the like. In the method for generating the transaction voucher according to the embodiments of the present disclosure, if a currency value is not enough, or if a currency value needs to be split, or the like, both the payment device and the collection device may automatically convert a large-denomination digital currency into small-denomination digital currencies, and a digital currency is paid in the form of a transaction voucher, a chain structure of the transaction voucher records historical transaction information and current transaction information corresponding to a currency string of the digital currency, so that a transaction certificate can be provided for a transaction, and a transaction can be traced. In addition, the payment device may further generate a plurality of vouchers based on a requirement of a transaction and on the basis of currency strings of digital currencies with a plurality of denominations, as to form a transaction voucher chain, and send the transaction voucher chain to the collection device, which improves the efficiency of multi-currency offline payment.

FIG. 3 is a schematic diagram of main steps of a method for verifying a transaction voucher according to one embodiment of the present disclosure.

As shown in FIG. 3, the method for verifying the transaction voucher according to one embodiment of the present disclosure mainly includes following step S301 to step S303.

Step S301: A transaction voucher sent by a payment device is received, the transaction voucher corresponding to a denomination of a current transaction.

Step S302: A second currency string of a corresponding denomination and a second sub-chain are obtained from the transaction voucher, the second sub-chain including current transaction information of the second currency string.

Step S303: The second currency string and the second sub-chain are respectively decrypted, and a signature is verified, as to verify the transaction voucher.

One or more transaction vouchers may be received. If a plurality of transaction vouchers are received, the verification of each transaction voucher may be achieved according to S302 and S303 above.

The method for verifying the transaction voucher according to the embodiments of the present disclosure may be implemented by a collection device. The transaction voucher is sent in ciphertext, so that the transaction voucher sent by the payment device also needs to be decrypted first after being received. For example, the payment device and the collection device may determine a session key by negotiation. The payment device encrypts the transaction voucher by using the session key, and the collection device decrypts the transaction voucher by using the corresponding session key. The payment device may encrypt the session key by using a public key provided by the collection device, and transmit the session key to the collection device. The collection device decrypts the session key by using its own private key after receiving the encrypted session key, to obtain a plaintext of the session key to decrypt the transaction voucher ciphertext.

The respectively verifying the second currency string and the second sub-chain may include: a validity of a signature of the second currency string and a validity of a signature of the second sub-chain are respectively verified.

In one embodiment, the verifying the validity of the signature of the second currency string includes: the signature of the second currency string is a two-stage signature generated by a central bank digital currency system and an operating agency digital currency system (for example, a commercial bank digital currency system) is verified; and the verifying the validity of the signature of the second sub-chain includes: the signature of the second sub-chain is a signature of a payer corresponding to the payment device is verified.

In one embodiment, the receiving the transaction voucher sent by the payment device includes: a transaction voucher chain, sent by the payment device, in the form of a data chain is received, the transaction voucher including a plurality of transaction vouchers, and a sum of the denominations corresponding to the plurality of transaction vouchers being equal to a total digital currency amount of the current transaction.

The obtaining the second currency string of the corresponding denomination and the second sub-chain from the transaction voucher includes: the plurality of transaction vouchers are obtained from the transaction voucher chain, and the second currency string of the corresponding denomination and the second sub-chain are obtained from each transaction voucher.

The method for verifying the transaction voucher according to the embodiments of the present disclosure achieves secure authentication of the chain digital currency and ensures the security of a transaction.

FIG. 4 is a schematic diagram of main steps of a method for storing a transaction voucher according to one embodiment of the present disclosure.

As shown in FIG. 4, the method for storing a transaction voucher according to one embodiment of the present disclosure mainly includes following step S401 to step S402.

Step S401: A received transaction voucher sent by a payment device is acquired, the transaction voucher including a second currency string and a second sub-chain, and the second sub-chain including current transaction information of the second currency string.

The acquired transaction voucher may be a voucher that has succeeded in verification. For example, the transaction voucher may be acquired from a local apparatus for verifying the transaction voucher (refer to the description of the apparatus 700 for verifying the transaction voucher). The local apparatus for verifying the transaction voucher is configured to implement the method for verifying the transaction voucher according to the embodiments of the present disclosure described above.

Step S402: the transaction voucher is stored to a chain storage structure as chain structure data of a digital currency.

In one embodiment, one transaction voucher is acquired. The storing the transaction voucher to the chain storage structure as the chain structure data of the digital currency may include: the transaction voucher is interpolated to a data region of one node of the chain storage structure, the node further including a voucher region used for storing an address of a next node of the node.

In one embodiment, a plurality of transaction vouchers are acquired, and the plurality of transaction vouchers form a transaction voucher chain in the form of a data chain. For example, the storing the transaction voucher to the chain storage structure as the chain structure data of the digital currency may include: the plurality of transaction vouchers of the transaction voucher chain are interpolated to data regions of a plurality of nodes of the chain storage structure based on an order of the transaction vouchers in the transaction voucher chain, each node further including a voucher region used for storing an address of a next node of the corresponding node.

In one embodiment, the chain storage structure is a chain table.

In one embodiment, the chain storage structure is stored in a local SE chip.

The method for storing the transaction voucher according to the embodiments of the present disclosure is implemented by the collection device. By the method for storing the transaction voucher according to the embodiments of the present disclosure, the data access efficiency can be improved, and the problems of low efficiency of current digital currency transactions and in quick pay of different currency strings. In addition, the chain structure data of the digital currency in the embodiments of the present disclosure is stored in a dispersed manner in an SE and other media through the method for storing the transaction voucher according to the embodiments of the present disclosure, which is convenient for storage and verification, and can delete old data at any time, thus reducing a need for a storage space during running.

It can be understood by persons skilled in the art that the payment device and collection device of the above embodiment are dynamically defined relative to a specific device. That is, when a device W receives a transaction voucher for payment from another device, the device W is a collection device, and when the device W sends a transaction voucher to another device, the device W is also referred to as a payment device.

FIG. 5 is a schematic diagram of a transaction flow according to one embodiment of the present disclosure.

As shown in FIG. 5, the transaction flow according to one embodiment of the present disclosure includes following step S501 to step S503.

Step S501: A payment device generates a payment voucher, and sends the generated payment voucher to a collection device.

Step S502: The collection device verifies the received payment voucher, and determines that the verification of the payment voucher succeeds.

The payment voucher is the transaction voucher according to the embodiments of the present disclosure. If the verification of the payment voucher succeeds, it means that the payment voucher is valid, and then S503 is performed. If the verification fails, it means that the payment voucher is invalid, and an error is reported, to reject the transaction.

Step S503: The collection device stores the payment voucher succeeding in verification to a chain storage structure.

The collection device may convert the payment voucher into the balance voucher of the collection device, and then store the balance voucher to the chain storage structure. An example method for converting the payment voucher to the balance voucher includes: a preset logo (which is usually arranged on a first byte) on the payment voucher is modified into another locally preset logo. The purpose of the conversion is to locally distinguish the received payment voucher from payment vouchers that have been stored in the chain storage structure. In addition, the efficiency of operation such as interpolation and deletion of a voucher can be improved by modifying the logo.

The transaction flow of the embodiments of the present disclosure is described in detail below.

The payment device stores a personal certificate issued by a trusted institution to a local SE storage medium (such as an SE chip in the payment device) for subsequent recognition of user's identity. In an offline transaction process, the payment device and the collection device first verify whether the personal certificates of the payment device and the collection device are valid through an institution certificate. Since two-party authentication is used, if the authentication fails, the transaction is rejected. When the authentication succeeds, a next step of the transaction is performed.

In a case where it is verified that the personal certificates of the payment device and the collection device are valid, the payment device generates a session key by using a digital currency session key factor composed of a temporarily generated true random number (that is, the first random number) and a temporarily generated Fact random number (that is, the second random number). For example, the hash operation is performed by using the two kinds of random numbers as the random numbers of the digital currency session key factor, so as to obtain the session key. The generated session key may be encrypted by using a public key provided by the collection device and transmitted to the collection device. When the payment device generates the payment voucher, the payment voucher is generated based on a currently paid currency string (namely, the second currency string) and a sub-chain (namely, the second sub-chain) that includes transaction information of the currency string in the current payment. The sub-chain may also include historical transaction information related to the currency string. For example, if a payment device B currently pays, to a collection device C, a currency string a denomination of 5 YUAN, and the currency string the denomination of 5 YUAN has been paid by a payment device A to B before the current transaction, the chain structure data of the digital currency includes the currency string (namely, the first currency string) with the denomination of 5 YUAN, and the sub-chain (namely, the first sub-chain) that records the historical transaction information indicating that the currency string is paid by A to B. The current payment device B generates chain data on the basis of transaction information indicating that the currency string with the denomination of 5 YUAN is paid by B to C in the current transaction, and connects the chain data to the first sub-chain to obtain the payment voucher, wherein the payment voucher includes the currency string with the denomination of 5 YUAN, the historical transaction information indicating that the currency string is paid by A to B, and the current transaction information indicating that the currency string is paid by B to C. The chain data composed of the historical transaction information indicating that the currency string is paid by A to B, the current transaction information indicating that the currency string is paid by B to C, and the like is also named the second sub-chain. The currency string is usually signed by the central bank and an operating agency, that is, it is signed by two stages. The payment device may also use a private key to sign the second sub-chain, and generate the payment voucher on the basis of the currency string with the two-stage signature and the signed second sub-chain. After the payment device generates the payment voucher, the payment device uses the session key to encrypt the payment voucher, calculates and generates a message multi-access control (MAC) including the encrypted payment voucher, and sends the message MAC to the collection device.

The collection device verifies the received message MAC, to obtain the encrypted payment voucher, decrypts and verifies the payment voucher by using the negotiated session key, to obtain a payment voucher plaintext. The collection device locally verifies the authenticity of the currency string of the digital currency in the payment voucher. If the verification fails, an error will be prompted, and the flow is stopped. If the verification succeeds, the collection device will update the transaction record. After receiving the payment voucher, the collection device verifies the signature (which may include the signature of the central bank and the signature of the operating institution) of the currency string (namely, the second currency string) and the signature (which may include the signature of the payer) of the sub-chain (namely, the second sub-chain). If the signature verification succeeds, the payment voucher is valid. By the transmission of the digital currency voucher (namely, the payment voucher) in the embodiments of the present disclosure, the divisibility of the currency string of the digital currency during transfer of part of an amount is achieved by means of constructing a transaction chain, and the payment voucher can be transmitted through the NFC and other communication manners, which achieves the transferability. The digital currency voucher contains transaction information, so that the transaction is traceable. Furthermore, the digital currency voucher may be stored in a secure hardware wallet medium or an SE chip, so that the digital currency voucher is tamper-proof and unforgerable. Non-repudiation of the transmission of the currency string of the digital currency is achieved by user's signature (namely, a signature of a payer). By means of verifying the generated digital currency voucher, the embodiments of the present disclosure reduce a risk of tampering and forging digital currencies in a circulation process, and improve the circulation security of digital currencies.

After the payment voucher succeeds in the verification performed by the collection device (that is, the payment voucher is valid), the payment voucher is stored in the form of a user-defined chain table (that is, the chain storage structure). In addition to a data region, there is also a voucher region in the chain storage structure. The voucher region stores an address of a next node of a current node. There are two special nodes in the chain storage structure, namely, a first node and a last node. In the chain storage structure, the first node may be referred to as a voucher header node, and the last node may be referred to as a voucher tail node. The voucher header node records a start address of the chain table. The entire chain table may be traversed on the basis of the start address. A subsequent pointer or reference of the voucher tail node does not point to a specific node, but to a null address (NULL), which indicates that the node is a tail node of the chain table.

The embodiments of the present disclosure can improve the operation efficiency by storing the payment voucher through the chain storage structure. For example, when a payee pays to a third party as a payer, the payer needs to pay the payment voucher received from the payee to the third party. Because the chain table in the embodiments of the present disclosure also supports the interpolation, search and deletion of data, thus improving the operation efficiency. Most of the existing technologies use an array to store transaction record data therefore, the storage and reading efficiency of details of each transaction is relatively low. Because a lot of data needs to be moved in an array to ensure the continuity of memory data during the interpolation and deletion of data, the time complexity is O(n). When data is interpolated to or deleted from the chain table in the embodiments of the present disclosure, because the nodes in the chain table structure do not need a continuous storage space, it is not necessary to move the nodes during the interpolation and deletion of the data in the chain table. For the deletion and interpolation of the chain table that stores payment vouchers, merely subsequent pointers of adjacent nodes need to be adjusted, so the corresponding time complexity is O(1). In this way, the efficiency of multi-currency offline payment is effectively improved.

Figure 6:
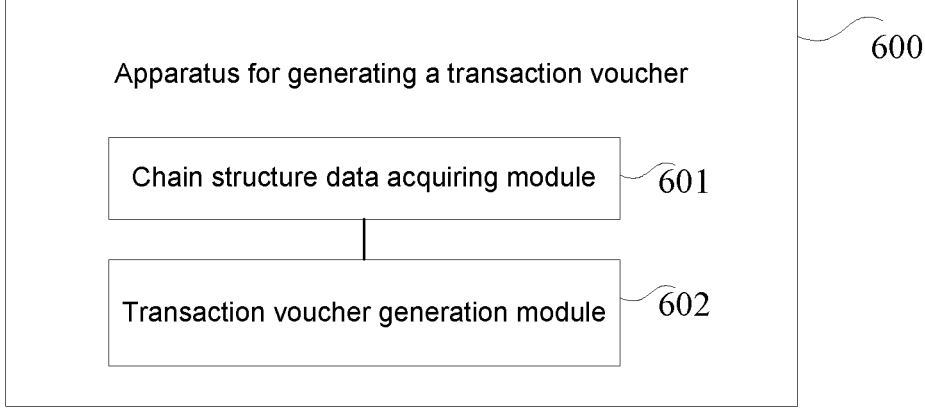
FIG. 6 is a schematic diagram of main modules of an apparatus for generating a transaction voucher according to one embodiment of the present disclosure.

FIG. 6 is a schematic diagram of main modules of an apparatus for generating a transaction voucher according to one embodiment of the present disclosure.

As shown in FIG. 6, the apparatus 600 for generating the transaction voucher according to one embodiment of the present disclosure mainly includes: a chain structure data acquiring module 601 and a transaction voucher generation module 602.

The chain structure data acquiring module 601 is configured to: in response to a received transaction request, acquire chain structure data of a digital currency, the chain structure data including a first currency string.

The transaction voucher generation module 602 is configured to generate based on the chain structure data, a transaction voucher corresponding to a denomination of a current transaction, the transaction voucher including a second currency string of a corresponding denomination and a second sub-chain, and the second sub-chain including current transaction information of the second currency string.

The chain structure data may further include a first sub-chain, and the first sub-chain includes historical transaction information of the first currency string.

The second sub-chain may further include the first sub-chain.

In one embodiment, the denomination of the first currency string is greater than the denomination of the second currency string. The transaction voucher generation module 602 is further configured to: generate two or more pieces of first chain structure data on the basis of the chain structure data, the first chain structure data including the first sub-chain, and at least one piece of the first chain structure data including the second currency string; and generate the transaction voucher based on the first chain structure data including the second currency string and the current transaction information of the second currency string.

The transaction voucher generation module 602 may be configured to: connect the first sub-chain in the first chain structure data including the second currency string to chain data generated on the basis of the current transaction information of the second currency string to obtain the second sub-chain; and sign the second sub-chain, and generate the transaction voucher based on the second currency string and the signed second sub-chain.

In one embodiment, the first currency string and the second currency string are the same currency string. The transaction voucher generation module 602 is configured to: connect the first sub-chain in the chain structure data to chain data generated on the basis of the current transaction information of the second currency string to obtain the second sub-chain; and sign the second sub-chain, and generate the transaction voucher based on the second currency string and the signed second sub-chain.

The apparatus 600 for generating the transaction voucher may further include a deletion module, configured to delete the chain structure data used for generating the transaction voucher from a chain storage structure in which the chain structure data is located.

In one embodiment, the chain storage structure is a chain table, and the chain structure data is obtained by traversing the chain table.

In one embodiment, a plurality of transaction vouchers are generated. Each transaction voucher is generated on the basis of one piece of chain structure data. The first currency strings of the various pieces of chain structure data respectively have respective denominations. A sum of the denominations corresponding to the plurality of transaction vouchers is equal to a total digital currency amount of the current transaction.

The transaction voucher generation module 602 may be configured to generate a transaction voucher chain in the form of a data chain based on the plurality of transaction vouchers.

The apparatus 600 for generating the transaction voucher may further include a transaction voucher sending module, configured to: perform a hash operation by using a first random number and a second random number, to obtain a session key; and encrypt the transaction voucher by using the session key, and send the encrypted transaction voucher to a collection device.

Figure 7:
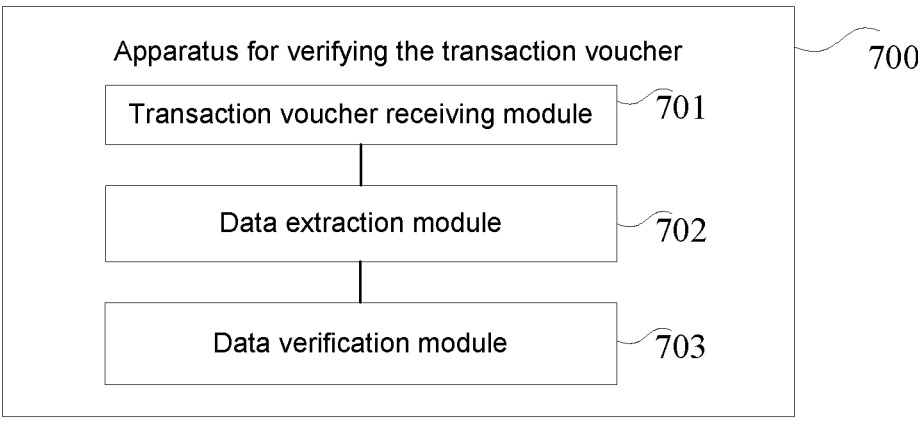
FIG. 7 is a schematic diagram of main modules of an apparatus for verifying a transaction voucher according to one embodiment of the present disclosure.

FIG. 7 is a schematic diagram of main modules of an apparatus for verifying a transaction voucher according to one embodiment of the present disclosure.

The apparatus 700 for verifying the transaction voucher according to one embodiment of the present disclosure mainly includes a transaction voucher receiving module 701, a data extraction module 702, and a data verification module 703.

The transaction voucher receiving module 701 is configured to receive a transaction voucher sent by a payment device, the transaction voucher corresponding to a denomination of a current transaction.

The data extraction module 702 is configured to obtain a second currency string of a corresponding denomination and a second sub-chain from the transaction voucher, the second sub-chain including current transaction information of the second currency string.

The data verification module 703 is configured to respectively verify the second currency string and the second sub-chain to verify the transaction voucher.

The data verification module 703 may be further configured to respectively verify a validity of a signature of the second currency string and a validity of a signature of the second sub-chain.

The data verification module 703 may be further configured to verify that the signature of the second currency string is a two-stage signature generated by a central bank digital currency system and an operating agency digital currency system; and verify that the signature of the second sub-chain is a signature of a payer corresponding to the payment device.

In one embodiment, the transaction voucher receiving module 701 may be configured to: receive a transaction voucher chain, sent by the payment device, in the form of a data chain, the transaction voucher including a plurality of transaction vouchers, and a sum of the denominations corresponding to the plurality of transaction vouchers being equal to a total digital currency amount of the current transaction.

The data extraction module 702 may be configured to: obtain the plurality of transaction vouchers from the transaction voucher chain, and obtain the second currency string of the corresponding denomination and the second sub-chain from each transaction voucher.

Figure 8:
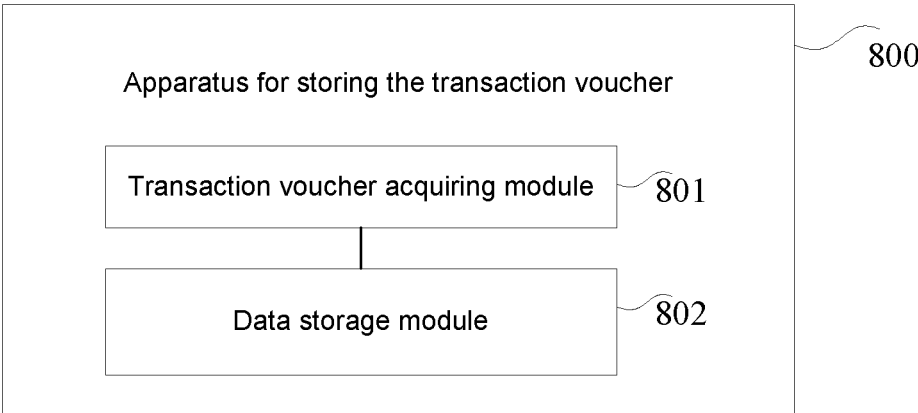
FIG. 8 is a schematic diagram of main modules of an apparatus for storing a transaction voucher according to one embodiment of the present disclosure.

FIG. 8 is a schematic diagram of main modules of an apparatus for storing a transaction voucher according to one embodiment of the present disclosure.

As shown in FIG. 8, the apparatus 800 for storing the transaction voucher according to one embodiment of the present disclosure mainly includes: a transaction voucher acquiring module 801 and a data storage module 802.

The transaction voucher acquiring module 801 is configured to acquire a received transaction voucher sent by a payment device, the transaction voucher including a second currency string and a second sub-chain, and the second sub-chain including current transaction information of the second currency string.

The data storage module 802 is configured to store the transaction voucher to a chain storage structure as chain structure data of a digital currency.

In one embodiment, one transaction voucher is obtained. The data storage module 802 is configured to: interpolate the transaction voucher to a data region of one node of the chain storage structure, the node further including a voucher region used for storing an address of a next node of the node.

In one embodiment, a plurality of transaction vouchers are obtained, and the plurality of transaction vouchers form a transaction voucher chain in the form of a data chain. The data storage module 802 is configured to: interpolate the plurality of transaction vouchers of the transaction voucher chain to data regions of a plurality of nodes of the chain storage structure based on an order of the transaction vouchers in the transaction voucher chain, each node further including a voucher region used for storing an address of a next node of the corresponding node.

In one embodiment, the chain storage structure is a chain table.

In one embodiment, the chain storage structure is stored in a local SE chip.

In addition, the implementation contents of the apparatuses for generating, verifying and storing the transaction voucher in the embodiments of the present disclosure have been described in detail in the above methods for generating, verifying and storing the transaction voucher, so repeated contents will not be described here.

Figure 9:
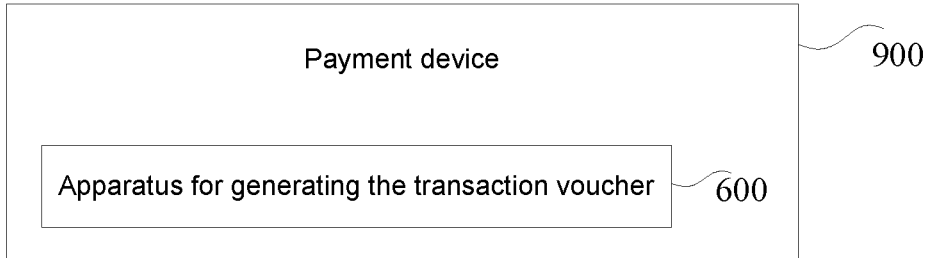
FIG. 9 is a schematic diagram of a main constitution of a payment device according to one embodiment of the present disclosure.

FIG. 9 is a schematic diagram of a main constitution of a payment device according to one embodiment of the present disclosure.

As shown in FIG. 9, the payment device 900 according to one embodiment of the present disclosure may include the apparatus 600 for generating the transaction voucher.

Figure 10:
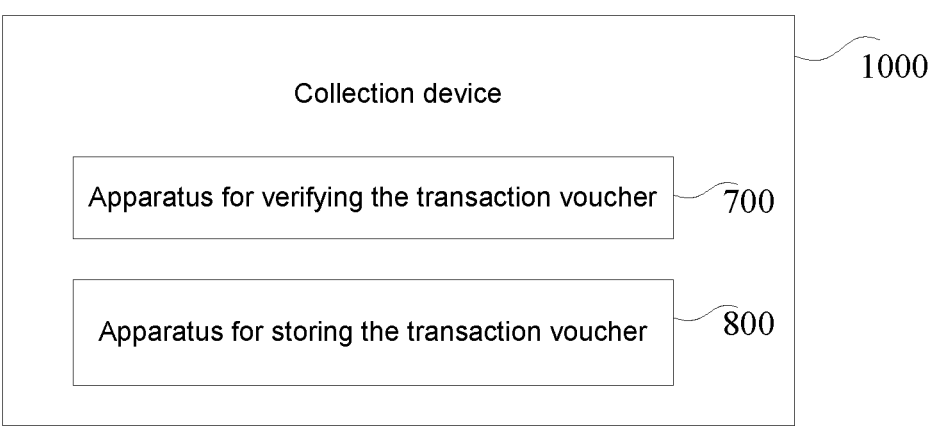
FIG. 10 is a schematic diagram of a main constitution of a collection device according to one embodiment of the present disclosure.

FIG. 10 is a schematic diagram of a main constitution of a collection device according to one embodiment of the present disclosure.

As shown in FIG. 10, the collection device 1000 according to one embodiment of the present disclosure mainly includes the apparatus 700 for verifying the transaction voucher and the apparatus 800 for storing the transaction voucher.

Figure 11:
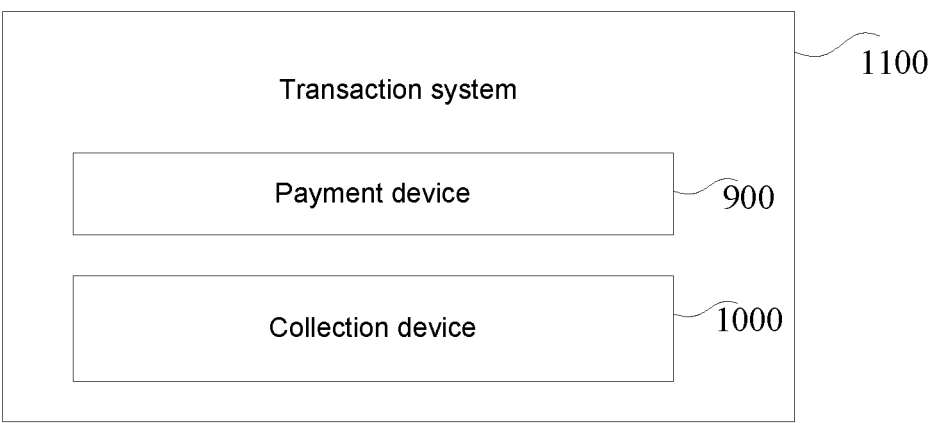
FIG. 11 is a schematic diagram of a main constitution of a transaction system according to one embodiment of the present disclosure.

FIG. 11 is a schematic diagram of a main constitution of a transaction system according to one embodiment of the present disclosure.

As shown in FIG. 11, the transaction system 1100 according to one embodiment of the present disclosure mainly includes the payment device 900 and the collection device 1000.

Figure 12:
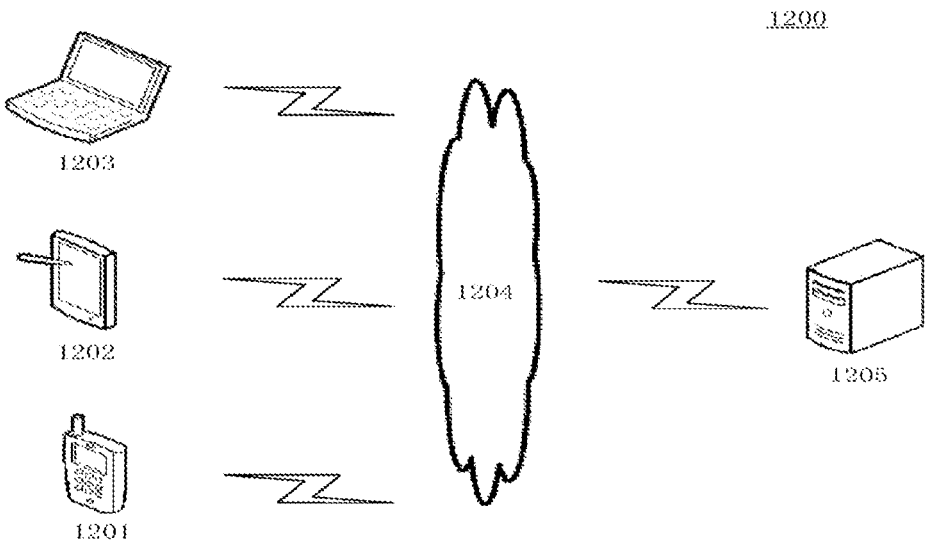
FIG. 12 is an architecture diagram of an exemplary system in which embodiments of the present disclosure can be applied.

FIG. 12 shows an exemplary system architecture 1200 that can apply the methods for generating, verifying and storing the transaction voucher or the apparatuses for generating, verifying and storing the transaction voucher according to the embodiments of the present disclosure.

As shown in FIG. 12, the system architecture 1200 may include terminal devices 1201, 1202, 1203, a network 1204, and a server 1205. The network 1204 is a medium for providing communication links between the terminal devices 1201, 1202, 1203 and the server 1205. The network 1204 may include various connection types, such as wired or wireless communication links, and optical fiber cables.

A user can use the terminal devices 1201, 1202, 1203 to interact with the server 1205 through the network 1204 to receive or send messages. The terminal devices 1201, 1202 and 1203 can be provided with various communication client applications, such as a shopping app, a web browser app, a search app, an instant messaging tool, an email client, and social platform software (only for example).

The terminal devices 1201, 1202 and 1203 can be various kinds of electronic devices having display screens and supporting web browsers, including but not limited to a smart phone, a tablet, a laptop and a desktop. The server 1205 can be a server that provides various services, such as a background management server that supports websites browsed by a user using the terminal devices 1201, 1202 and 1203 (only for example). The background management server can analyze and do other processings on a received product information query request and other data, and feed back processing results (such as target push information-only for example) to the terminal devices.

It should be noted that the methods for generating, verifying and storing a transaction voucher provided by the embodiments of the present disclosure are usually implemented by the terminal devices 1201, 1202, 1203. Correspondingly, the apparatuses for generating, verifying and storing a transaction voucher are usually arranged in the terminal devices 1201, 1202, 1203.

It should be understood that the quantities of the terminal device, the network and the server in FIG. 12 are only schematic. According to implementation needs, there can be terminal devices, networks and servers in any quantities.

Figure 13:
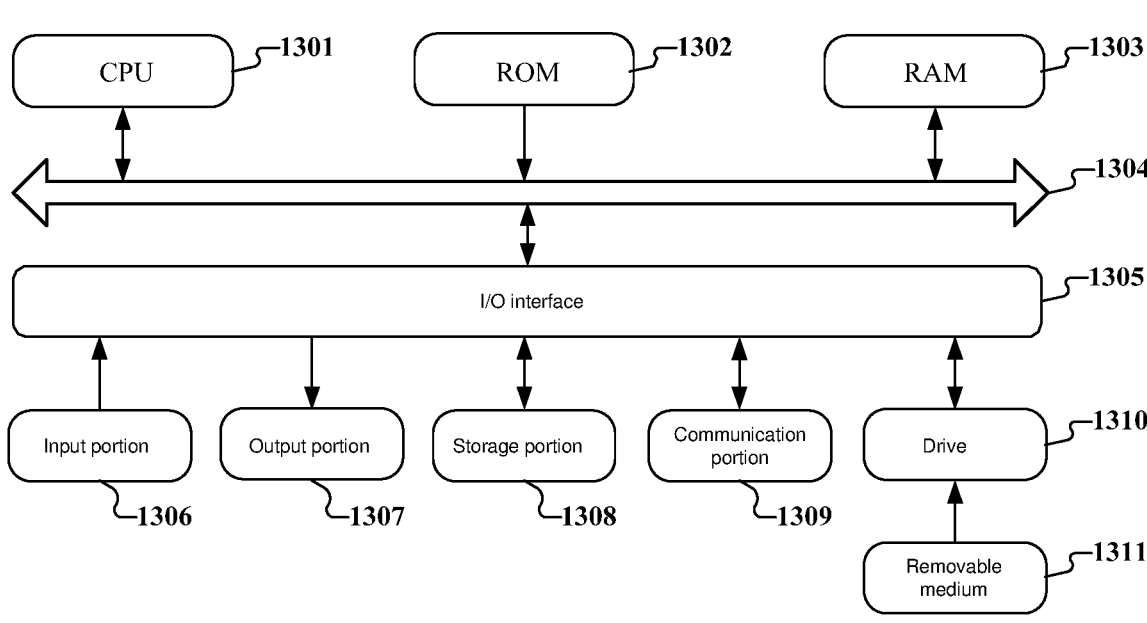
FIG. 13 is a schematic structural diagram of a computer system of a terminal device applicable to realize embodiments of the present disclosure.

FIG. 13 shows a schematic structural diagram of a computer system 1300 of a terminal device applicable to realize embodiments of this application. The terminal device shown in FIG. 13 is only an example, and should not bring any limitation on the functions and the scope of use of the embodiments of this application.

As shown in FIG. 13, the computer system 1300 includes a central processing unit (CPU) 1301, which can execute various appropriate actions and processings according to programs that are stored in a read-only memory (ROM) 1302 or programs that are loaded from a storage portion 1308 into a random access memory (RAM) 1303. Various programs and data required for operations of the system 1300 are also stored in the RAM 1303. The CPU 1301, the ROM 1302, and the RAM 1303 are connected by means of a bus 1304. An input/output (I/O) interface 1305 is also connected to the bus 1304.

The following components are connected to I/O interface 1305: input portions 1306 including a keyboard, a mouse, and the like; output portions 1307 Including a cathode ray tube (CRT), a liquid crystal display (LCD), a speaker and the like; storage portions 1308 including a hard disk and the like; and communication portions 1309 including a network interface card such as a an LAN card and a modem. The communication portion 1309 performs communication processing via a network such as Internet. A drive 1310 is also connected to I/O interface 1305 as required. Removable media 1311, such as a magnetic disk, an optical disk, a magneto-optical disk, a semiconductor memory, and the like, are mounted on the drive 1310 as required, so that computer programs read from them can be installed to the storage portions 1308 as required.

In particular, according to the embodiments of the present disclosure, the processes described above with reference to the flow diagram can be implemented as computer software programs. For example, the embodiments of the present disclosure include a computer program product, which includes a computer program loaded on a computer-readable medium, and the computer program includes program codes for executing the method shown in the flow diagram. In such an embodiment, the computer program may be downloaded and installed from a network through the communication portion 1309, and/or installed from the removable media 1311. When it executed by the CPU 1301, the computer program performs the above-mentioned functions defined in the system of this application.

It should be noted that the above-mentioned computer-readable medium of the present disclosure may be a computer-readable signal medium or a computer-readable storage medium or any combination of the above two. The computer-readable storage medium may be, for example, but is not limited to, an electrical, magnetic, optical, electromagnetic, infrared, or semiconductor system, apparatus, or device, or a combination of any of the above. More specific examples of the computer-readable storage medium may include, but are not limited to: an electrical connection with one or more wires, a portable computer disk, a hard disk, an RAM, an ROM, an erasable programmable read-only memory (EPROM or flash memory), an optical fiber, a portable compact disk read-only memory (CD-ROM), an optical storage device, a magnetic storage device, or any suitable combination of the above. In the present disclosure, the computer-readable storage medium may be any tangible medium that contains or stores a program, and the program may be used by or in combination with an instruction execution system, apparatus, or device. In the present disclosure, the computer-readable signal medium may include a data signal propagated in a baseband or as a part of a carrier wave, and computer-readable program code is carried. This propagated data signal can take many forms, including, but is not limited to, an electromagnetic signal, an optical signal, or any suitable combination of the above. The computer-readable signal medium may also be any computer-readable medium other than the computer-readable storage medium. The computer-readable medium may send, propagate or transmit a program for use by or in combination with the instruction execution system, apparatus, or device. The program code contained on the computer-readable medium can be transmitted by any suitable medium, including, but is not limited to: radio, a wire, an optical cable, a radio frequency (RF), and the like, or any suitable combination of the above.

The flow diagrams and block diagrams in the accompanying drawings illustrate possibly implemented system architectures, functions, and operations of systems, methods, and computer program products based on various embodiments of the present disclosure. In this regard, each block in the flowcharts or block diagrams may represent a module, program segment, or a part of a code, and the module, program segment, or the part of code contains one or more executable instructions used for realizing specified logic functions. It should also be noted that in some alternative implementations, the functions marked in the blocks may also occur in a different order from the order marked in the drawings. For example, two blocks shown in succession can actually be executed substantially in parallel, and they can sometimes be executed in a reverse order, depending on the functions involved. It should also be noted that each block in the block diagrams or flow diagrams, and combinations of the blocks in the block diagrams or flow diagrams can be implemented by a dedicated hardware-based system that performs specified functions or operations, or it can be implemented by a combination of dedicated hardware and computer instructions.

The modules involved in the embodiments described in the present disclosure can be implemented in software or hardware. The described modules can also be arranged in a processor, for example, which can be described as: A processor includes a chain structure data acquiring module and a transaction voucher generation module. The names of these modules do not constitute a restriction on the modules themselves. For example, the chain structure data acquiring module can also be described as "a module configured to acquire chain structure data of a digital currency in response to a received transaction request".

On the other hand, the present disclosure further provides a computer-readable medium, which can be included in the device described in the above embodiment, or can exist alone without being assembled into the device. The computer-readable medium carries one or more programs. When executed by the device, the above one or more programs cause the device to perform actions including: in response to a received transaction request, acquiring chain structure data of a digital currency, the chain structure data including a first currency string; and generating based on the chain structure data, a transaction voucher corresponding to a denomination of a current transaction, the transaction voucher including a second currency string of a corresponding denomination and a second sub-chain, and the second sub-chain including current transaction information of the second currency string.

According to the technical solutions of the embodiments of the present disclosure, including: in response to a received transaction request, acquiring chain structure data of a digital currency, the chain structure data including a first currency string; and generating based on the chain structure data, a transaction voucher corresponding to a denomination of a current transaction, the transaction voucher including a second currency string of a corresponding denomination and a second sub-chain, and the second sub-chain including current transaction information of the second currency string, a payment certificate can be provided for a transaction, so that the transaction can be traced. The method for verifying the transaction voucher provided according to another embodiment of the present disclosure can ensure the security of the transaction. The method for storing the transaction voucher according to still another embodiment of the present disclosure can improve the efficiency of reading and storing transaction data. The various embodiments of the present disclosure can improve the transaction efficiency and the user experience.

The above-mentioned specific implementations do not constitute a limitation on the protection scope of the present disclosure. Persons skilled in the art should understand that various modifications, combinations, sub-combinations and substitutions may occur depending on design requirements and other factors. Any modification, equivalent replacement and improvement made within the spirit and principle of the present disclosure shall all fall within the protection scope of the present disclosure.

What is claimed is:

1. A method for generating a transaction voucher, comprising:

in response to a received transaction request, acquiring, by a payment device, chain structure data of a digital currency, the chain structure data comprising a first currency string;

generating, by the payment device, based on the chain structure data, a transaction voucher corresponding to a denomination of a current transaction, the transaction voucher comprising a second currency string of a corresponding denomination and a second sub-chain, and the second sub-chain comprising current transaction information of the second currency string, wherein generating, by the payment device, based on the chain structure data, a transaction voucher corresponding to a denomination of a current transaction further comprises: signing the second sub-chain by using a signature of the payment device, signing the second currency by using a two- stage signature generated by a central bank digital currency system and an operating agency digital currency system, and generating the transaction voucher based on the signed second currency string and the signed second sub-chain;

storing, by the payment device, the transaction voucher through a chain storage structure;

sending, by the payment device, the transaction voucher to a collection device;

obtaining, by a collection device, a received transaction voucher sent by a payment device, the transaction voucher comprising a second currency string and a second sub-chain, and the second sub-chain comprising current transaction information of the second currency string;

decrypting, by the collection device, the second currency string to obtain a signature;

verifying, by the collection device, that the signature of the second currency string is a two-stage signature generated by a central bank digital currency system and an operating agency digital currency system;

decrypting, by the collection device, the second sub-chain to obtain a signature; and verifying that the signature of the second sub-chain is a signature of a payer corresponding to the payment device.

2. The method as claimed in claim 1, wherein the chain structure data further comprises a first sub-chain, wherein the first sub-chain comprises historical transaction information of the first currency string, and the second sub-chain further comprises the first sub-chain.

3. The method as claimed in claim 1, wherein a denomination of the first currency string is greater than a denomination of the second currency string; and generating based on the chain structure data, the transaction voucher corresponding to the denomination of the current transaction comprises:

generating two or more pieces of first chain structure data based on the chain structure data, the two or more pieces of first chain structure data comprising the first sub-chain, and at least one piece of the first chain structure data comprising the second currency string; and generating the transaction voucher based on the first chain structure data comprising the second currency string and the current transaction information of the second currency string.

4. The method as claimed in claim 3, wherein generating the transaction voucher based on the first chain structure data comprising the second currency string and the current transaction information of the second currency string comprises:

connecting the first sub-chain in the first chain structure data comprising the second currency string to chain data generated based on the current transaction information of the second currency string, as to obtain the second sub-chain; and signing the second sub-chain, and generating the transaction voucher based on the second currency string and the signed second sub-chain.

5. The method as claimed in claim 2, wherein the first currency string and the second currency string are the same currency string; and generating based on the chain structure data, the transaction voucher corresponding to the denomination of the current transaction comprises:

connecting the first sub-chain in the chain structure data to chain data generated based on the current transaction information of the second currency string, as to obtain the second sub-chain; and signing the second sub-chain, and generating the transaction voucher based on the second currency string and the signed second sub-chain.

6. The method as claimed in claim 1, after generating the transaction voucher, comprising:

deleting the chain structure data used for generating the transaction voucher from a chain storage structure in which the chain structure data is located.

7. The method as claimed in claim 6, wherein the chain storage structure is a chain table, and the chain structure data is obtained by traversing the chain table.

8. The method as claimed in claim 1, wherein a plurality of transaction vouchers are generated; each transaction voucher is generated based on one piece of chain structure data; first currency strings of various pieces of chain structure data respectively have respective denominations; a sum of denominations corresponding to the plurality of transaction vouchers is equal to a total digital currency amount of the current transaction; and the method further comprises: generating a transaction voucher chain in a form of a data chain based on the plurality of transaction vouchers.

9. The method as claimed in claim 1, after generating the transaction voucher corresponding to the denomination of the current transaction, comprising:

performing a hash operation by using a first random number and a second random number, to obtain a session key; and encrypting the transaction voucher by using the session key, and sending the encrypted transaction voucher to a collection device.

10. The method as claimed in claim 9, wherein in a case where it is verified that personal certificates of a payment device and the collection device are valid, performing the hash operation by using the first random number and the second random number, to obtain the session key is executed.

11. A method for verifying a transaction voucher, comprising:

receiving, by a collection device, a transaction voucher sent by a payment device, the transaction voucher corresponding to a denomination of a current transaction;

obtaining, by the collection device, a second currency string of a corresponding denomination and a second sub-chain from the transaction voucher, the second sub-chain comprising current transaction information of the second currency string; and respectively verifying, by the collection device, the second currency string and the second sub-chain to verify the transaction voucher, wherein respectively verifying the second currency string and the second sub-chain further comprises: decrypting the second currency string to obtain a signature, verifying that the signature of the second currency string is a two-stage signature generated by a central bank digital currency system and an operating agency digital currency system, decrypting the second sub-chain to obtain a signature, and verifying that the signature of the second sub-chain is a signature of a payer corresponding to the payment device.

12. The method as claimed in claim 11, wherein receiving the transaction voucher sent by the payment device comprises: receiving a transaction voucher chain, sent by the payment device, in a form of a data chain, the transaction voucher comprising a plurality of transaction vouchers, and a sum of denominations corresponding to the plurality of transaction vouchers being equal to a total digital currency amount of the current transaction; and obtaining the second currency string of the corresponding denomination and the second sub-chain from the transaction voucher comprises: obtaining the plurality of transaction vouchers from the transaction voucher chain, and obtaining the second currency string of the corresponding denomination and the second sub-chain from each transaction voucher.

13. A method for storing a transaction voucher, comprising:

obtaining, by a collection device, a received transaction voucher sent by a payment device, the transaction voucher comprising a second currency string and a second sub-chain, and the second sub-chain comprising current transaction information of the second currency string;

decrypting the second currency string to obtain a signature;

verifying that the signature of the second currency string is a two-stage signature generated by a central bank digital currency system and an operating agency digital currency system;

decrypting the second sub-chain to obtain a signature;

verifying that the signature of the second sub-chain is a signature of a payer corresponding to the payment device; and storing, by the collection device, the transaction voucher to a chain storage structure as chain structure data of a digital currency.

14. The method as claimed in claim 13, wherein one transaction voucher is obtained; and storing the transaction voucher to the chain storage structure as chain structure data of the digital currency comprises:

interpolating the transaction voucher to a data region of one node of the chain storage structure, the node further comprising a voucher region used for storing an address of a next node of the node.

15. The method as claimed in claim 13, wherein a plurality of transaction vouchers are obtained, and the plurality of transaction vouchers form a transaction voucher chain in a form of a data chain; and storing the transaction voucher to the chain storage structure as the chain structure data of the digital currency comprises:

interpolating the plurality of transaction vouchers of the transaction voucher chain to data regions of a plurality of nodes of the chain storage structure based on an order of the plurality of transaction vouchers in the transaction voucher chain, each node further comprising a voucher region used for storing an address of a next node of the corresponding node.

16. The method as claimed in claim 13, wherein storing the transaction voucher to the chain storage structure as the chain structure data of the digital currency comprises:

modifying a preset logo on the transaction voucher to another locally preset logo, as to transform the transaction voucher into a balance voucher, and storing the balance voucher to the chain storage structure.

17. The method as claimed in claim 13, wherein the chain storage structure is a chain table.

18. The method as claimed in claim 13, wherein the chain storage structure is stored in a local secure element (SE) chip.

* * * * *